US011656829B2

(12) United States Patent
Cuvillier et al.

(10) Patent No.: US 11,656,829 B2
(45) Date of Patent: May 23, 2023

(54) CONTROL AND DISPLAY DEVICE, IN PARTICULAR FOR A VEHICLE

(71) Applicant: FAURECIA INTERIEUR INDUSTRIE, Nanterre (FR)

(72) Inventors: Christophe Cuvillier, Saint Ouen l'Aumone (FR); Thibault Le Mesnil, Cergy (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 45 days.

(21) Appl. No.: 17/601,642

(22) PCT Filed: Mar. 31, 2020

(86) PCT No.: PCT/EP2020/059085
§ 371 (c)(1),
(2) Date: Oct. 5, 2021

(87) PCT Pub. No.: WO2020/201265
PCT Pub. Date: Oct. 8, 2020

(65) Prior Publication Data
US 2022/0206734 A1   Jun. 30, 2022

(30) Foreign Application Priority Data
Apr. 5, 2019   (FR) ...................................... 1903704

(51) Int. Cl.
*G06F 3/14*       (2006.01)
*B60K 37/06*      (2006.01)
(Continued)

(52) U.S. Cl.
CPC ................ *G06F 3/14* (2013.01); *B60K 37/06* (2013.01); *B60H 1/0065* (2013.01);
(Continued)

(58) Field of Classification Search
CPC ........... G06F 3/14; B60K 37/06; B60K 35/00; B60K 2370/34; B60K 2370/349;
(Continued)

(56) References Cited

U.S. PATENT DOCUMENTS 10,556,508 B2 *   2/2020   Boron ................... B60K 37/06
2007/0227795 A1   10/2007  Dorn et al.
(Continued)

FOREIGN PATENT DOCUMENTS

CN   107800420 B   *  3/2021   ............. B60K 37/06
DE   102012110700 B4 *  7/2020   ............. B60K 35/00
(Continued)

OTHER PUBLICATIONS

International Search Report with English translation corresponding to International Application No. PCT/EP2020/059085, dated Jul. 8, 2020, 5 pages.
(Continued)

*Primary Examiner* — Vinh T Lam
(74) *Attorney, Agent, or Firm* — Reising Ethington P.C.

(57) ABSTRACT

A control and display device for a vehicle includes a control element and an associated display area. In the display area are superimposed: a first layer that is opaque except for a translucent complex pictogram, the complex pictogram combining two separate elementary pictograms; two separate filtering areas, each filtering area having the shape of a corresponding single elementary pictogram, each filtering area transmitting wavelengths within a respective range, the respective ranges of wavelengths being disjoint; and a light source suitable for emitting within the respective different ranges of wavelengths, concomitantly or alternately. The two filtering areas are positioned between the light source and the complex pictogram on the opaque layer.

17 Claims, 5 Drawing Sheets

(51) Int. Cl.
*B60H 1/00* (2006.01)
*B60N 2/02* (2006.01)

(52) U.S. Cl.
CPC .... *B60K 2370/143* (2019.05); *B60K 2370/25* (2019.05); *B60K 2370/332* (2019.05); *B60K 2370/34* (2019.05); *B60K 2370/345* (2019.05); *B60K 2370/349* (2019.05); *B60N 2/02* (2013.01)

(58) Field of Classification Search
CPC ........ B60K 2370/131; B60K 2370/143; B60K 2370/128; B60K 2370/332; B60K 2370/25; B60K 2370/122; B60K 2370/345; B60H 1/0065; B60N 2/02
See application file for complete search history.

(56) References Cited

U.S. PATENT DOCUMENTS

| | | | |
|---|---|---|---|
| 2007/0230170 A1* | 10/2007 | Mita | G09F 13/04 |
| | | | 362/812 |
| 2011/0147181 A1 | 6/2011 | Catlin | |
| 2013/0127897 A1* | 5/2013 | Baker | G09F 13/08 |
| | | | 29/458 |
| 2013/0147401 A1* | 6/2013 | Choi | G09F 13/04 |
| | | | 362/231 |
| 2014/0145840 A1 | 5/2014 | Guerreiro | |
| 2017/0175981 A1 | 6/2017 | Steiner et al. | |

FOREIGN PATENT DOCUMENTS

| | | | | |
|---|---|---|---|---|
| EP | 1839945 A1 * | 10/2007 | ............. | B60Q 3/044 |
| EP | 1839945 A1 | 10/2007 | | |
| FR | 2872953 A1 * | 1/2006 | ............. | B60K 35/00 |
| FR | 2872953 A1 | 1/2006 | | |
| GB | 2496667 A * | 5/2013 | ............. | B60K 35/00 |
| GB | 2496667 A | 5/2013 | | |
| JP | 2013037241 A * | 2/2013 | | |
| JP | 2013109348 A * | 6/2013 | ............. | B60K 35/00 |
| JP | 6012039 B2 * | 10/2016 | ............. | B60K 35/00 |
| WO | 2010025160 A1 | 3/2010 | | |

OTHER PUBLICATIONS

Written Opinion with English translation corresponding to International Application No. PCT/EP2020/059085, dated Jul. 8, 2020, 13 pages.

* cited by examiner

CONTROL AND DISPLAY DEVICE, IN PARTICULAR FOR A VEHICLE

TECHNICAL FIELD

The invention relates to a control and display device, in particular for a vehicle, more particularly for a motor vehicle.

BACKGROUND

Control and display devices are known in the automotive field. Such a device provides a user with one or more control elements, such as buttons for example, and a display area associated with the control element. The display area can make it possible in particular to indicate a state of a device in the vehicle, following actuation of the control element, for example by changing the displayed pictogram. As the display area is generally of simple design in order to limit the cost of the control and display device, the changing of the pictogram displayed is carried out by displaying a different pictogram on an area separate from the one where the first pictogram was displayed, before actuation of the control element.

The proliferation of control and display devices in the passenger compartment of vehicles, however, poses a problem because the space available for the display area(s) is reduced.

SUMMARY

The invention aims to provide a control and display device that does not have the disadvantages of the prior art.

To this end, in at least some embodiments the invention provides a control and display device, in particular for a vehicle, comprising a control element and a display area associated with the control element, wherein the following are superimposed in the display area:
  a first layer that is opaque except for at least one translucent complex pictogram, the complex pictogram combining at least two separate elementary pictograms;
  at least two separate filtering areas, each filtering area having the shape of a corresponding single elementary pictogram, each filtering area transmitting wavelengths within a respective range, the respective ranges of wavelengths being different, preferably non-overlapping; and
  at least one light source, preferably a single light source, suitable for emitting within the different respective ranges of wavelengths, concomitantly or alternately;
  wherein the at least two filtering areas are positioned between the at least one light source and the complex pictogram, on the opaque layer.

Thus, the appearance of the display can be changed according to the actuation of the control element, each appearance of the display being representative of a respective piece of information. For example, when the ranges are non-overlapping, one or the other of the elementary pictograms can be displayed according to the actuation of the control element, by emitting light within a first range of wavelengths that are absorbed by the first filtering area but which the second filtering area allows to pass through and by emitting light within a second range of wavelengths that are absorbed by the second filtering area but which the first filtering area allows to pass through. It is thus possible to display two pieces of information within a limited space, by changing the emission color of the light source.

According to preferred embodiments, the device according to the invention provides one or more of the following features, alone or in combination:
  each filtering area is carried by the first layer or by another layer;
  the device further comprises a third filtering area of partial and/or selective transmission, with a predefined transmittance, with predefined transmissible colors, positioned between the at least two filtering areas and the opaque layer;
  the third filtering area has at least a portion superimposed on the at least two elementary pictograms;
  the filtering area also has a portion offset from the elementary pictograms and superimposed on the complex pictogram;
  the light source is a light-emitting diode;
  the opaque layer is dark in color, except for the complex pictogram which is light in color;
  the device comprises at least two layers, preferably exactly two layers, a filtering area being formed on each of the layers, each filtering area having the shape of a corresponding single elementary pictogram;
  an actuation of the control element is able to modify the range of wavelengths emitted by the at least one light source, and, preferably, successive actuations of the control element modify the range of wavelengths emitted by the at least one light source according to a sequence comprising one or more of the following configurations:
    i) no light emission from the at least one light source;
    ii) light emissions within a first of said ranges of wavelengths;
    iii) light emissions within a second of said ranges of wavelengths; and
    iv) light emissions within the first and second of said ranges, concomitantly;
  the control element is touch-sensitive, an actuation of said control element controlling a predefined function, illustrated by said at least one elementary pictogram displayed on said display area; and the device comprises at least one among:
    a system for opening/closing the windows of the motor vehicle;
    a system for controlling the heat, ventilation, and air conditioning in the motor vehicle;
    a system for controlling an audio system of the motor vehicle;
    a system for adjusting the position of a seat of the motor vehicle; and
    a system for adjusting the position of one or more mirrors of the motor vehicle.

BRIEF DESCRIPTION OF DRAWINGS

Other features, details, and advantages of the invention will become apparent from reading the detailed description below, and from analyzing the accompanying drawings, in which.

DESCRIPTION OF EMBODIMENTS

In the various figures, the same references denote identical or similar elements. For brevity, only the elements useful to understanding the embodiments described are represented in the figures and described in detail below.

In the following description, when referring to absolute position qualifiers, such as the terms "front", "rear", "top", "bottom", "left", "right", etc., or relative qualifiers, such as the terms "above", "below", "upper", "lower", etc., or to orientation qualifiers, such as "horizontal", "vertical", etc., unless otherwise specified these are in reference to the orientation of the figures.

Moreover, "wavelength" is understood here to mean a wavelength of a ray of light, meaning a wavelength of light or an illuminating wavelength.

Figure 1:
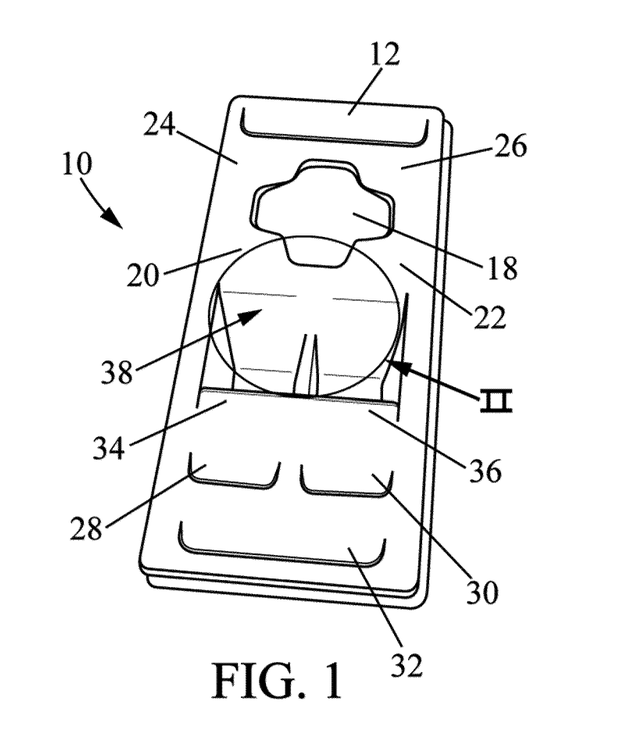
FIG. 1 is a schematic view of an example of a control and display device for a vehicle.

FIG. 1 schematically illustrates a perspective view of a control and display device 10 for a vehicle, in particular for a motor vehicle. The control and display device 10 is intended to be fixed in the passenger compartment, in particular on an armrest or on the dashboard of the vehicle.

The control and display device 10 here comprises several sets of control elements, in particular in the form of buttons. The buttons may be actuated by pressing on them, requiring button movement to control the actuation of a corresponding device. Preferably, however, the buttons are touch-sensitive unless otherwise stated. Touch-sensitive is understood here to mean that simple contact by the user's finger is sufficient for the button to control the actuation of the corresponding device or devices, possibly without movement of the button.

Figure 3:
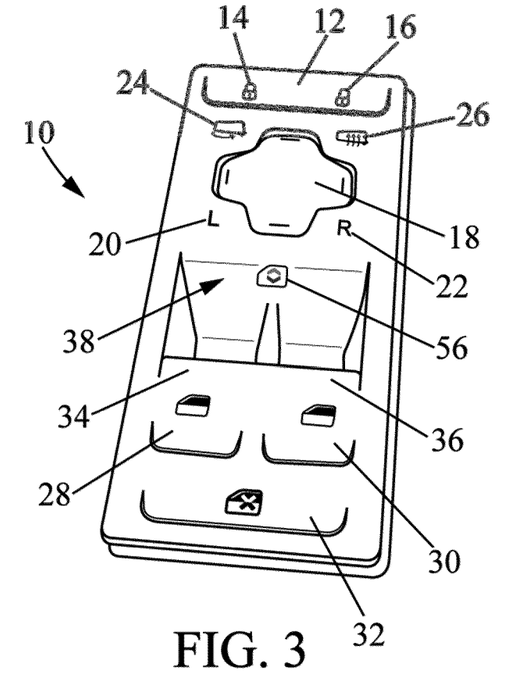
FIG. 3 schematically represents a view similar to FIG. 1, corresponding to a first backlighting configuration of the display area of the control and display device for a vehicle.
Figure 4:
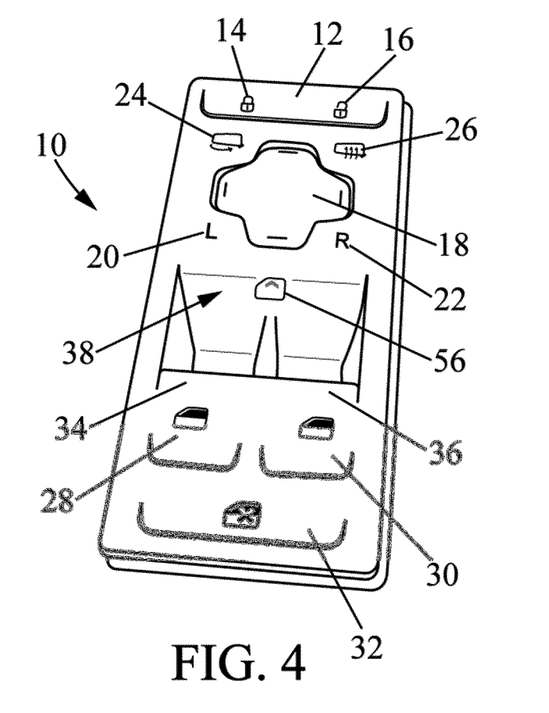
FIG. 4 schematically represents a view similar to FIG. 1, corresponding to a second backlighting configuration of the display area of the control and display device for a vehicle.
Figure 5:
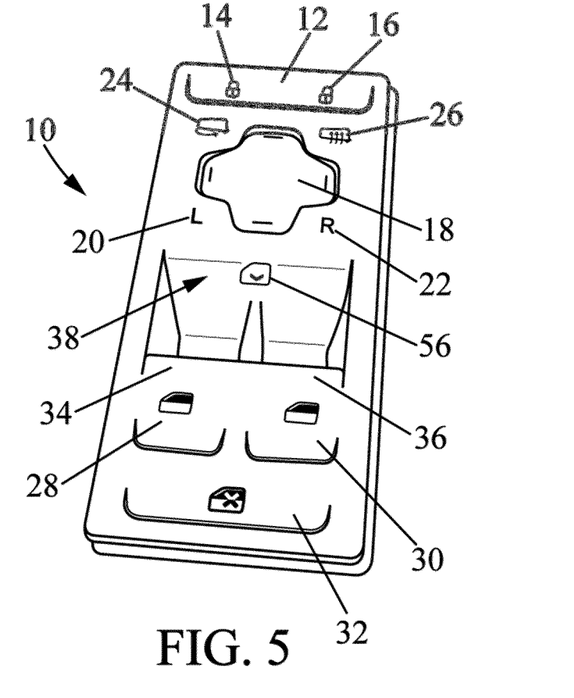
FIG. 5 schematically represents a view similar to FIG. 1, corresponding to a third backlighting configuration of the display area of the control and display device for a vehicle.

Here, a first button 12 allows controlling a centralized locking of the doors and trunk of the vehicle. Two pictograms 14, 16, visible in particular in FIGS. 3 to 5, are implemented on this first button 12, which are selectively illuminated according to whether or not the centralized locking is actuated.

The control and display device 10 also comprises a set of controls for adjusting the outside mirrors of the vehicle. Here, this set of controls comprises an t-shaped control element 18, enabling adjustment of the tilt of the mirrors relative to the horizontal and their orientation relative to the vertical, two buttons 20, 22 for selecting the mirror to be adjusted—left or right, a third button 24 controlling the folding of the mirrors along the body, and a fourth button 26 controlling a defrosting of the mirrors. Each of these buttons 20, 22, 24, 26 is provided with at least one associated pictogram. For example, the two buttons 20, 22 are respectively provided with an "L" and "R" pictogram for "left" and "right".

The control and display device 10 further includes two window selection control elements 28, 30—for example front and rear for controlling the windows. These two control elements 28, 30 here are in the form of buttons. Another control element 32, also a button, allows controlling the opening-prevention for the rear window. These buttons 28, 30, 32 are also equipped with pictograms associated with the function of the buttons, these pictograms being visible in FIGS. 3 to 5.

The control and display device 10 further includes two control elements 34, 36 which each allow controlling the upward or downward movement of one of the windows selected using buttons 28, 30. Each button 28, 30 can be associated with a respective window. Here the two control elements 34, 36 are in the form of buttons. Here these buttons are of the fish hook type. In other words, these buttons 34, 36 are mounted so as to pivot about an axis and are actuated by pulling or pushing on them to rotate them about this axis in one direction or the other. These buttons 34, 36 may have two actuation positions, in each direction of actuation. Thus, if pivoted beyond a defined angle, the buttons 34, 36 can control a second action. In practice, this is implemented in particular in order to control a partial opening or closing of the window, by keeping the pivot angle of the buttons 34, 36 below the defined threshold. However, if one of the buttons 34, 36 is rotated beyond this threshold angle, then a complete and automatic opening or closing of the window is ordered. In this case, the user can stop the command to open or close the window before it is fully completed, the opening or closing being continued automatically.

Finally, a display area 38 is associated with control elements 28, 30, which allows a user to view which windows have been selected by means of the control elements 28, 30 and therefore can be opened or closed using the corresponding buttons 34, 36.

Figure 2:
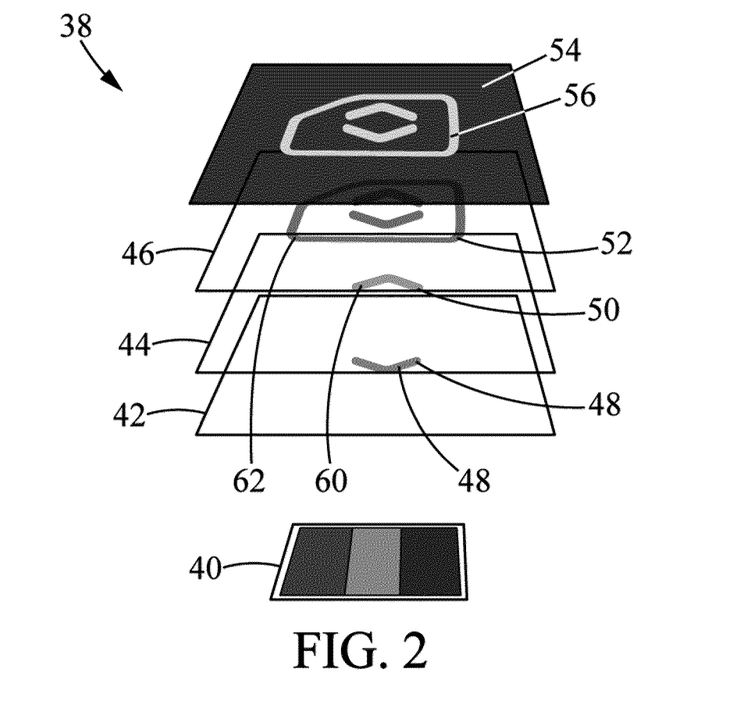
FIG. 2 schematically represents an exploded view of detail II of FIG. 1.

As can be seen in FIG. 2, here this display area 38 comprises a light source 40, a stack of three transparent layers 42, 44, 46 each provided with a respective filtering area 48, 50, 52, and an opaque layer 54 that is opaque except for a translucent pictogram 56 referred to as "complex". In the example illustrated, the opaque layer 54 is dark in color, in particular black, while the complex pictogram 56 is light in color, in particular white. The three transparent layers 42, 44, 46 are interposed between the light source 40 and the opaque layer 54. Here, the layers 48, 50, 52, 56 are separate substrates. Alternatively, however, the layers 48, 50, 52, 56 can be formed by coatings carried by the same substrate, in particular on opposite faces of the same substrate. Thus, "layer" is understood to mean a sheet, preferably thin, such as a film for example, or a coating on the surface of a substrate, in particular of such a sheet.

The light source 40 here is a single light source, suitable for emitting, successively or concomitantly:
 a red light, which may be formed of a single wavelength or of a plurality of wavelengths comprised within a first range of wavelengths;
 a blue light, which may also be formed of a single wavelength or of a plurality of wavelengths comprised within a second range of wavelengths; and
 a substantially white light including the red and blue lights mentioned above.

The blue and red lights are advantageously non-overlapping, meaning they have no emission wavelength in common. In other words, the first and second ranges of wavelengths are advantageously disjoint. More generally, the first and second ranges of wavelengths are different, meaning that at least one of the two ranges of wavelengths comprises a wavelength not belonging to the other of the two ranges of wavelengths, preferably each of the two ranges of wavelengths comprising a wavelength not belonging to the other of the two ranges of wavelengths.

Alternatively, the third color may be composed of only blue and red lights.

For example, the light source 40 is a light-emitting diode. Such a light source is indeed compact and easy to control in order to emit in different ranges of wavelengths.

The first transparent layer 42 has a first filtering area 48. The first filtering area 48 here is blue, meaning it absorbs all radiations except those corresponding to blue. The first filtering area 48 has the shape of a first so-called "elementary" pictogram 58, here a downward arrow.

The second transparent layer 44 has a second filtering area 50. The second filtering area 50 here is red, meaning it absorbs all radiations except those corresponding to red. The second filtering area 50 has the shape of a second elementary pictogram 60, here an upward arrow.

The third layer 46 has a third filtering area 52. The third filtering area 52 here is gray, meaning it partially absorbs all visible wavelengths, in particular the wavelengths of the blue and red lights mentioned above. The third filtering area 52 has the shape of a third pictogram 62, consisting here of two arrows respectively pointing up and down and a border surrounding these two arrows which symbolizes a door. Each of the arrows of the third pictogram 62 is superimposed on the arrow of the first pictogram 58 and second pictogram 60 respectively. Conversely, the border does not overlap with any of the arrows of the first 58 and second 60 pictograms. In other words, the border is offset from these first and second pictograms 58, 60.

In the illustrated example, the third filtering area 52 thus provides a function of partial transmission of light, so as to give an opaque appearance to the complex pictogram 56 of the opaque layer 54, when the light source 40 is switched off and the complex pictogram 56 is illuminated by a light source external to the device 10. To achieve this, the third filtering area 52 may have a transmittance greater than or equal to 5%, preferably greater than or equal to 10%, and/or less or equal to 40%, preferably less than or equal to 30%. According to a variant that is not illustrated, the third filtering area 52 may substantially correspond to the entire surface of the third layer 46.

Additionally or alternatively, the third layer 46, or at the very least the third filtering area 52, transmits only certain colors. These colors are preferably red, blue, green, and yellow.

Finally, the opaque layer 54 is for example black in color, for a look considered by users to be more elegant. The pictogram 56 is said to be "complex" because it corresponds to the superposition of the first, second, and third pictograms 58, 60, 62. This complex pictogram 56 here is white in color. More generally, the complex pictogram 56 is lighter than the rest of the opaque layer 54, which is therefore darker.

The operation of the control and display device 10 is described below with reference to FIGS. 3 to 5.

When a user presses the two buttons 28, 30 for selecting the front and rear windows, the light source 40 emits a white light. In this case, the first filtering area 58 absorbs all wavelengths except the blues and the second filtering area 60 absorbs all wavelengths except the reds. As a result, the complex pictogram 56 is illuminated as shown in FIG. 3:

the portion of the complex pictogram 56 superimposed on the first pictogram 58 is illuminated in blue;

the portion of the complex pictogram 56 superimposed on the second pictogram 60 is illuminated in red; and the portion of the complex pictogram 56 which is not superimposed on either the first pictogram 58 or the second pictogram 60 is illuminated in gray.

Thus, in this case, the entire complex pictogram 56 is illuminated. In particular, the two arrows of the complex pictogram are illuminated—but in different colors—indicating to the user that, in this case, each of the control buttons 34, 36 controls all windows on a respective side of the vehicle.

If the user now presses only front window selection button 28, then the light source 40 emits a red light. In this case, the first filtering area 58 absorbs all wavelengths emitted by the light source. Conversely, the second filtering area 60 allows the wavelengths emitted by the light source to pass through. As a result, the complex pictogram 56 is illuminated as shown in FIG. 4:

the portion of the complex pictogram 56 superimposed on the first pictogram 58 is not illuminated;

the portion of the complex pictogram 56 superimposed on the second pictogram 60 is illuminated in red; and the portion of the complex pictogram 56 which is not superimposed on either the first pictogram 58 or the second pictogram 60 is illuminated in red.

Thus, in this case, only the up arrow and the border of the complex pictogram 56 are illuminated, in red. Conversely, the down arrow appears unlit. This indicates to the user that, in this case, each of the control buttons 34, 36 controls the front windows, on a respective side of the vehicle.

Finally, if the user presses only the rear window selection button 30, then the light source 40 emits a blue light. In this case, the first filtering area 58 allows the wavelengths emitted by the light source to pass through. Conversely, the second filtering area 60 absorbs all wavelengths emitted by the light source 40. As a result, the complex pictogram 56 is illuminated as shown in FIG. 5:

the portion of the complex pictogram 56 superimposed on the first pictogram 58 is illuminated in blue;

the portion of the complex pictogram 56 superimposed on the second pictogram 60 is not illuminated; and the portion of the complex pictogram 56 which is not superimposed on either the first pictogram 58 or the second pictogram 60 is illuminated in blue.

Thus, in this case, only the down arrow and the border of the complex pictogram 56 are illuminated, in blue. Conversely, the up arrow appears unlit. This indicates to the user that, in this case, each of the control buttons 34, 36 controls the rear windows, on a respective side of the vehicle.

It should be noted here that the third filter 52, gray, makes it possible in particular to avoid reflections from the first and second filtering areas, when the light source is not in operation and when external light is incident on the opaque layer 54. This third transparent layer 46 and the third filtering area 52, gray, also act as a layer of diffusion and/or antireflective effect. Such a layer of diffusion and/or antireflective effect is preferably positioned between the first and second transparent layers 42, 44 provided with the first and second filtering areas 48, 50 on the one hand, and the opaque layer 54 on the other hand.

The invention is not limited solely to the exemplary embodiments described above, but on the contrary is capable of numerous variations accessible to those skilled in the art.

First of all, the example described relates more particularly to the field of vehicles, in particular motor vehicles. However, the described control and display devices can be implemented in other technical fields.

Here, each transparent layer is associated with a single filtering area. Alternatively, several filtering areas, of different colors, can be implemented on the same transparent layer.

Furthermore, in the example illustrated, the display area is not on the control element but is offset from the control element. Alternatively, however, the display area can be on the control element. In this case, in particular, the control element is preferably touch-sensitive.

Also, in a more general manner than the example described, the elementary pictograms 58, 60 can each display distinctive illuminated looks for a range of wavelengths, each elementary pictogram 58, 60 displaying distinctive illuminated looks for respective ranges of wavelengths.

The control and display device may also include an electronic control unit for controlling the light source according to whether or not one or more of the control elements is actuated. In particular, the electronic control unit can be programmed so that actuation of a control element changes the range of wavelengths within which the at least one light source emits. The electronic control unit is preferably programmed so that successive actuations of the control element modify the wavelength range in which the at least one light source emits, according to a sequence comprising one or more of following configurations:

i) no light emission from the at least one light source;
 ii) light emissions within a first of said ranges of wavelengths;
 iii) light emissions within a second of said ranges of wavelengths; and
 iv) light emissions within the first and second of said ranges of wavelengths, concomitantly.

Furthermore, in the example illustrated above, the control and display device is a system for opening/closing the windows of a motor vehicle, in particular suitable for mounting on the door of the motor vehicle and/or on a seat armrest of the motor vehicle seat.

Additionally or alternatively, the control and display device may in particular comprise at least one among:

a system for adjusting the heat, ventilation, and/or air conditioning in the motor vehicle;
 a system for controlling an audio system of the motor vehicle;
 a system for adjusting the position of a seat of the motor vehicle; and
 a system for adjusting the position of one or more mirrors of the motor vehicle.

The invention claimed is:

1. Control and display device, comprising a control element and a display area associated with the control element, wherein the following are superimposed in the display area:
 a first layer that is opaque apart from at least one translucent complex pictogram, the complex pictogram combining at least two separate elementary pictograms; and
 at least two separate filtering areas, each filtering area having the shape of a corresponding single elementary pictogram, each filtering area transmitting wavelengths within a respective range, the respective ranges of wavelengths being different;
 at least one light source, suitable for emitting within the different respective ranges of wavelengths, concomitantly or alternately;
 wherein the at least two filtering areas are positioned between the at least one light source and the complex pictogram on the opaque layer.

2. Control and display device according to claim 1, wherein each filtering area is carried by the first layer.

3. Control and display device according to claim 1, further comprising a third filtering area of selective transmission, with a predefined and/or partial transmittance, with predefined transmissible colors, positioned between the at least two filtering areas and the opaque layer.

4. Control and display device according to claim 3, wherein the third filtering area has at least a portion superimposed on the at least two elementary pictograms.

5. Control and display device according to claim 4, wherein the filtering area also has a portion offset from the elementary pictograms and superimposed on the complex pictogram.

6. Control and display device according to claim 1, wherein the light source is a light-emitting diode.

7. Control and display device according to claim 1, wherein the opaque layer is dark in color, except for the complex pictogram which is light in color.

8. Control and display device according to claim 1, comprising at least two layers, a filtering area being formed on each of the layers, each filtering area having the shape of a corresponding single elementary pictogram.

9. Control and display device according to claim 1, wherein an actuation of the control element is able to modify the range of wavelengths emitted by the at least one light source.

10. Control and display device according to claim 1, wherein the control element is touch-sensitive, an actuation of said control element controlling a predefined function, illustrated by said at least one elementary pictogram displayed on said display area.

11. Control and display device according to claim 1, wherein the respective ranges of wavelengths are non-overlapping.

12. Control and display device according to claim 1, comprising a single light source.

13. Control and display device according to claim 1, wherein each filtering area is carried by another layer.

14. Control and display device according to claim 8, comprising exactly two layers.

15. Control and display device according to claim 9, wherein successive actuations of the control element modify the range of wavelengths emitted by the at least one light source according to a sequence comprising at least one of the following configurations:
 i) no light emission from the at least one light source;
 ii) light emissions within a first of said ranges of wavelengths;
 iii) light emissions within a second of said ranges of wavelengths; and
 iv) light emissions within the first and second of said ranges, concomitantly.

16. Control and display device according to claim 1, configured for use in a vehicle.

17. Control and display device according to claim 16, comprising at least one among:
 a system for opening/closing the windows of the motor vehicle;
 a system for adjusting the heat, ventilation, and/or air conditioning in the motor vehicle;
 a system for controlling an audio system of the motor vehicle;
 a system for adjusting the position of a seat of the motor vehicle; and
 a system for adjusting the position of one or more mirrors of the motor vehicle.

* * * * *